Patented Feb. 17, 1925.

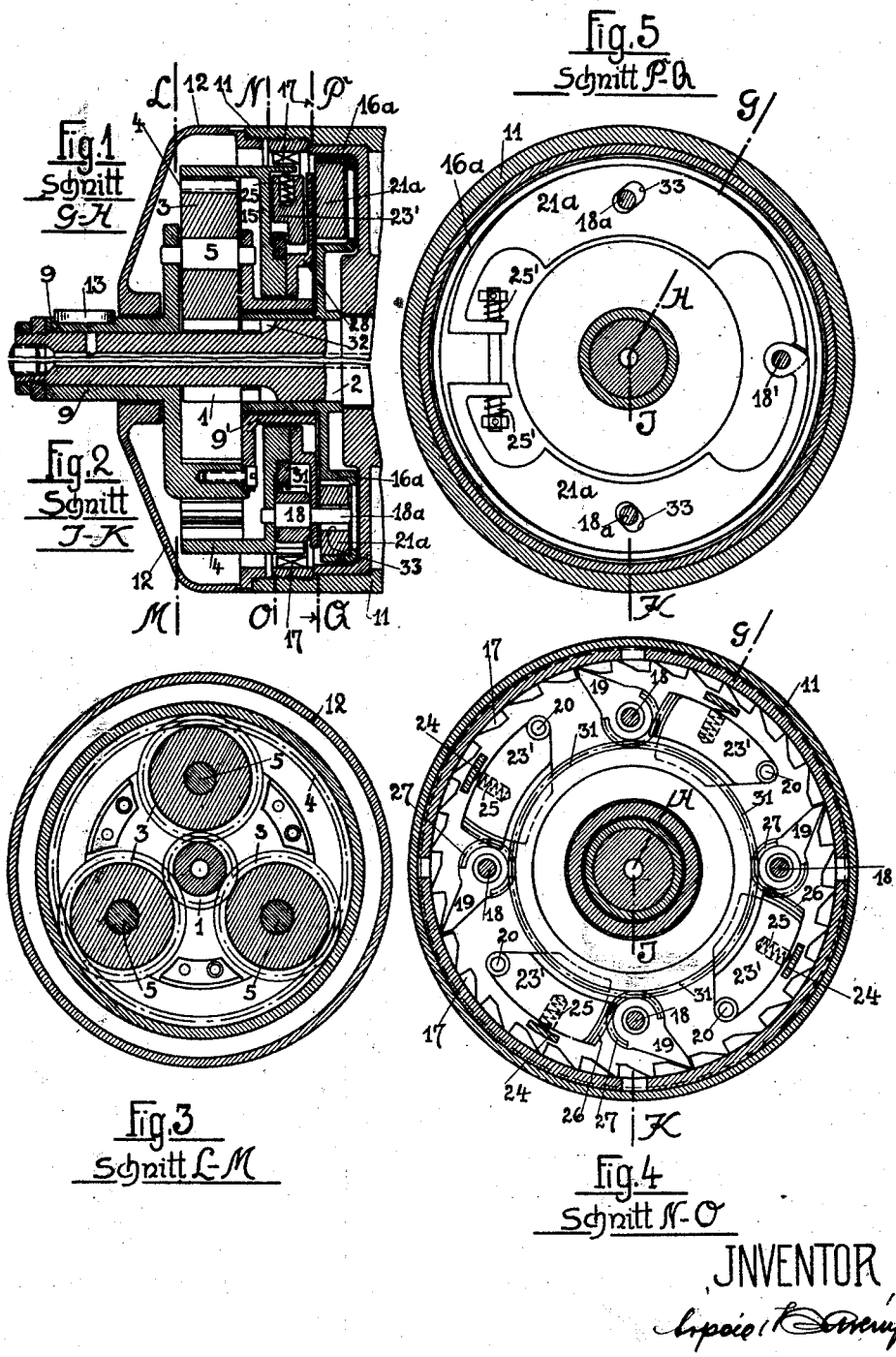

1,526,949

UNITED STATES PATENT OFFICE.

ARPÁD BÁRÉNYI, OF NUREMBERG, GERMANY, ASSIGNOR TO FRITZ NEUMEYER AKTIENGESELLSCHAFT, OF NUREMBERG, GERMANY.

STARTING-GEAR CLUTCH.

Application filed December 27, 1920. Serial No. 433,458.

*To all whom it may concern:*

Be it known that I, ARPÁD BÁRÉNYI, a citizen of the German Empire, residing at Nuremberg, Germany, have invented certain new and useful Improvements in Starting-Gear Clutches, of which the following is a specification.

My invention refers to starting gear for internal combustion motors and more especially to a centrifugal friction clutch for a planet wheel starting gear. It essentially consists in centrifugal elements, held together by springs and articulated in parallel with the generator shaft to the internally toothed hollow wheel of the planet gear. These centrifugally operated elements in conjunction with a friction ring of the largest possible size, surrounding said elements and operatively geared to the generator shaft constitute the friction coupling serving to drive the motor generator by means of the internal combustion motor. By means of a friction coupling of this description there are obtained a series of advantages which shall be enumerated hereafter.

In the drawings affixed to this specification and forming part thereof, a planet wheel starting gear embodying my invention is illustrated by way of example. In the drawings—

Figs. 1 and 2 are longitudinal sections, namely

Fig. 1 on line G—H and Fig. 2 on line J—K in Figs. 3 and 4,

Fig. 3 is a cross-section on line L—M in Fig. 1 through a planet gear of the usual type, Fig. 4 is a cross-section on line N—O in Fig. 1, disclosing the locking mechanism of the planet gear, and Fig. 5 is a cross-section on line P—Q in Fig. 1, disclosing the novel arrangement and use of the centrifugal elements.

All the cross-sections are taken as when looking from the internal combustion motor toward the motor generator, i. e. in the direction denoted by the arrows.

The dynamo (not shown), which may be fed by a storage battery or accumulator and in starting the device may be run as a motor, is intended to start the internal combustion motor (also not shown) and is in turn operated as a generator by this said motor as soon as it has entered into operation. This working operation is assumed as being generally known. The driving wheel 1 of the shaft 2 of the motor generator forms conjointly with three intermediate wheels 3 and a hollow internally toothed wheel 4 a speed wheel planet gear of well known type which allows of a fairly large gear ratio of transmission within a comparatively small space. The journals 5 on which the intermediate wheels are mounted loosely to rotate, are lodged within the flanges of the hollow shaftings or bushings 9, 9¹. The forward bushing 9 traverses the cover 12 of the gear box 11 and is adapted to carry outside of said gear box by aid of a cotter or key 13 the driving wheel of the internal combustion motor to be started. Lateral web shaped extension of bushing 9 arranged between the intermediate wheels 3 and the inner flanged portion thereof is bolted up to the flange of the rearward bushing 9¹. Bushing 9 is mounted loosely to rotate on the cylindrical end of shaft 2, and bushing 9¹ in a similar way upon a part 16ª located on shaft 2 and hereinafter more fully to be described. On bushing 9¹ there is furthermore mounted loosely to rotate, the end disk 15 of the internally toothed planet ring 4. To this said disk there is fixed a disk-shaped flange 28. Within the said flange 28 and the disk 15 there are arranged pivots 18 on which check pawls 19 are loosely mounted that are for their part adapted to co-operate with an internally toothed ratchet wheel 17 firmly screwed within the stationary gear box 11. Besides this, there are arranged both within flange 28 as well as in the disk 15, pivots 20, on which are loosely mounted centrifugal weights or gyrating masses 23¹ adapted to engage by means of toothed segments 26 the correspondingly toothed sections 27 of the hubs of the pawls. Springs 25 bearing up on the outside against the ledges 24 of the disk 15 constantly tend to force the centrifugal weights 23 inwards and therewith the pawls 19 outwards, and by these means to maintain these latter in engagement with the ratchet wheel 17. On a shoulder of the disk 15 there is mounted loosely to rotate a toothed ring 31, adapted to mesh with all the toothed segments 27 of the hubs of the pawls. The instrumentalities above referred to do not form the subject matter of my invention, being here only illustrated and set forth to explain the general manner of operation.

In accordance with my present invention, the centrifugal elements 21$^a$ serving to operate the friction coupling driving the generator, are mounted upon extension 18$^1$ of one of the pivots 18 for the pawls, that is to say, in parallel with the generator shaft 2 and upon the disk 15 of the internally toothed, hollow planet wheel 4. The said centrifugal frictionally operating jaws or blocks 21$^a$ are held together by springs 25$^1$ and embraced by friction ring 16$^a$ of the largest possible diameter, the hub of which is accommodated within bushing 9 and which by aid of catches 32 engages the driving wheel 2 of the generator shaft. Slots 33 formed in the centrifugal elements 21$^a$ serve as guides for the extensions 18$^a$ of two diametrically opposite pivoting studs 18 of the pawls 19 and traversing them and as abutments to prevent the centrifugal elements from being tightened up too far by springs 25$^1$. I am aware that similar centrifugal devices are known per se, however they have hitherto not been employed for the purpose specified and in connection with the hollow internally toothed wheel of a planet gear.

The manner of operation of the device is as follows:

*Starting.*—On the motor generator fed by the accumulator being allowed to rotate toward the right (looking from key 13) and operating as a motor, then all the intermediate wheels 3 engaging the driving wheel 1 of the dynamo will revolve toward the left and tend to likewise draw the internally toothed hollow wheel 4 along toward the left. However, this latter is prevented from following this rotation by the fact of its check pawls 19 having now entered into engagement with the stationary ratchet wheel 17. As a result, the intermediate wheels revolve along the internally toothed gear wheel 4 and rotate their support 9, 9$^1$, together with the driving wheel mounted on the key 13 and appertaining to the internal combustion engine, and therewith this engine itself so as to cause the latter to revolve toward the right. In the course of this operation, the transmission from higher to lower speed becomes effective. When starting, the centrifugal elements 21$^a$ together with the disk 15 are at rest. Hence, they cannot effect any coupling or generally disturbing action as distinguished from the flat friction rings usually employed in the indirect friction coupling devices of the type known, and one set of which has always to follow the quick rotatory motion of the electromotor and the other the far slower rotation of the internal combustion motor. I am thereby also enabled to obviate the drawbacks of the previous coupling means referred to in which, in consequence of the pressure exerted by the centrifugal element rotating along with the support for the intermediate wheels, the frictional centrifugal members are liable to mutually wear away and abrade each other, and at the least will come to exert a braking action on the running of the electromotor.

*Generation of current.*—The internal combustion motor having been started, the right-hand rotation of the supporting sleeves or hollow shaftings 9$^1$ for the intermediate wheels is accelerated and the entire planet gear including the hollow, internally toothed wheel 4 is combined to a co-revolving gyrating unit. The disk 15 now turns toward the right, taking the check pawls 19 along which under the action of the springs 25, are primarily caused to jump across the teeth of the ratchet wheel 17, but which are then maintained by the centrifugal weights 23$^1$ out of engagement with the circular rack 17. This disengaging movement takes place with great uniformity with all the said pawls, because the loosely mounted toothed ring 31, enforces the said uniformity by reason of its engaging with all the toothed segments of the hubs belonging to the pawls. When this state has been attained, the centrifugal elements 21$^1$ have meanwhile been thrust so far outward counter to the action of springs 25$^1$ as to enable them to frictionally bear up on the inside against the friction ring 16$^a$, and, as the number of revolutions increases, they come to take this latter and by this means also the dynamo shaft 2 coupled to it along by intervention of the engaging members 32 belonging to the generator which latter now generates current and charges the accumulator or delivers current in any other manner whatsoever. In this connection the following advantages appertaining to my improved centrifugal coupling may be noted:

The centrifugal elements, forming conjointly a practically closed ring admit without increasing the width thereof and with the comparatively small extension of the gear structure, of the combination with a heavy gyrating mass. Furthermore than that, inasmuch as the friction ring 16$^a$ may be made as large as the inside diameter of the gear box will permit, the high frictional action produced by the large masses will come to be applied along the longest lever arm available so that very large torques may be transmitted and without exceeding the admissible specific surface pressure between the parts in frictional contact, because these operate with the major portion of their circumference. On the other hand, no such large gyrating masses may be inserted into the centrifugal elements of the customary type articulated crosswise between two intermediate wheels of a planet gear, the peripheral extent of which is in addition considerably restricted by the supporting webs of the flanges situated intermediate said wheels. Again, as the correspondingly smaller centrifugal forces generated in the prior art referred to come to act axially upon the friction rings not as far toward the outside as possible but only at a small distance from the generator shaft, this known type of centrifugal coupling device with the merely small useful diameters of the gear box available, does not permit the driving of more powerful generators, nor the starting of powerful internal combustion motors. Besides, I am enabled by my invention to provide a support of more simple construction for the intermediate wheels as compared with the previous system of coupling requiring a support for the intermediate wheels of the planet gear extremely difficult to manufacture and decidedly expensive, as also transmission rods and frequently replaceable clutch disks, which become unnecessary in my invention. Then, the planet gear is much less liable to wear because, in this improved construction, with the three intermediate wheels to be arranged in accordance with my invention, running more quietly and smoothly, than in the known form of construction in which the arrangement of the centrifugal elements crosswise between the intermediate wheels will only admit of the interposition of two such wheels.

In addition, the improved coupling also affords a more flexible and more uniform driving of the generator in the event of a sudden increase in the speed of the internal combustion motor in view of the absence of sticking of the parts so as to allow of a temporary sliding motion between them.

*Stopping the internal combustion motor.*—On the dropping of the number of revolutions of the internal combustion motor, when it is being stopped, below that at which the centrifugal weights come to bear up against the friction ring 16ª, this latter will again be released and the check pawls 19 will again be thrown into engagement with the ratchet wheel 17 by springs 25. If now, the internal combustion motor before coming to a final stop tends to rebalance itself, it may readily do so because during the return motion only gear wheel 4, 15, but not the friction ring 16ª has been checked in its movement. The like condition will prevail in the event of back fire of the motor when starting. Here, too, any undesirable straining action on the pawls is obviated by the fact that the motor cannot run backwards without the speed of its forward motion being first reduced to zero, and before this occurs the check pawls will have been thrown in and the centrifugal weights released from the friction ring 16ª. Such a free oscillatory action on the part of the internal combustion motor can however not be obtained by means of the customary type of centrifugal multiple disk clutch, because the clutch disks, being then also compressed together when starting, generally tend to stick. It may thus happen that with the prior device the internal combustion motor may under certain circumstances come to a stop in a decidedly unfavourable position in which the motor generator will be entirely unable to set it in motion again.

I claim:—

1. In starting gear for internal combustion engines in combination, a driven shaft operatively connected with the engine, a driving shaft operatively connected with a source of power, a stationary casing in which said shafts are carried, a planet carrier and planet wheels adapted to rotate on said driving shaft and connected with said driven shaft, a pinion on said driving shaft and an orbit gear, both adapted to mesh with said planet wheels, means for locking said orbit gear against rotation, centrifugal means for releasing said orbit gear, a friction pulley operatively connected with said driving shaft and a centrifugal clutch member pivoted to said orbit gear, said clutch member being adapted to cooperate with said friction pulley.

2. In starting gear for internal combustion engines, in combination, a driven shaft operatively connected with the engine, a driving shaft operatively connected with a source of power, a stationary casing in which said shafts are carried, a planet carrier and planet wheels adapted to rotate on said driving shaft and connected with said driven shaft, a pinion on said driving shaft and an orbit gear, both adapted to mesh with said planet wheels, means for locking said orbit gear against rotation, centrifugal means for releasing said orbit gear, a friction pulley operatively connected with said driving shaft, and a centrifugal clutch member extending at right angles to the axis of said shafts and pivoted to said orbit gear, said clutch member being adapted to cooperate with said friction pulley.

3. In starting gear for internal combustion engines in combination, a driven shaft operatively connected with the engine, a driving shaft operatively connected with a source of power, a stationary casing in which said shafts are carried, a planet carrier and planet wheels adapted to rotate on said driving shaft and connected with said driven shaft, a pinion on said driving shaft and an orbit gear, both adapted to mesh with said planet wheels, means for locking said orbit gear against rotation, means for operatively connecting said locking means, centrifugal means for releasing said orbit gear, a friction pulley operatively connected with said driving shaft and a centrifugal clutch member pivoted to said orbit gear, said clutch member being adapted to cooperate with said friction pulley.

4. In starting gear for internal combustion engines in combination, a driven shaft operatively connected with the engine, a driving shaft operatively connected with a source of power, a stationary casing in which said shafts are carried, a planet carrier and planet wheels adapted to rotate on said driving shaft and connected with said driven shaft, a pinion on said driving shaft and an orbit gear, both adapted to mesh with said planet wheels, teeth formed on said casing, a toothed pawl pivoted on said orbit gear and adapted to cooperate with the teeth on said casing, a gear mounted on said orbit gear for free rotation and meshing with the toothed portion of said pawl, a toothed weight pivoted on said orbit gear and adapted to mesh also with the toothed portion of said pawl, a friction pulley operatively connected with said driving shaft and a centrifugal clutch member pivoted to said orbit gear, said clutch member being adapted to cooperate with said friction pulley.

5. In starting gear for internal combustion engines in combination, a driven shaft operatively connected with the engine, a driving shaft operatively connected with a source of power, a stationary casing in which said shafts are carried, a planet carrier and planet wheels adapted to rotate on said driving shaft and connected with said driven shaft, a pinion on said driving shaft and an orbit gear, both adapted to mesh with said planet wheels, teeth formed on said casing, a toothed pawl pivoted on said orbit gear and adapted to cooperate with the teeth on said casing, a gear mounted on said orbit gear for free rotation and meshing with the toothed portion of said pawl, a toothed weight pivoted on said orbit gear and adapted to mesh also with the toothed portion of said pawl, a spring adapted to act on said weight, a friction pulley operatively connected with said driving shaft, and a centrifugal clutch member pivoted to said orbit gear, said clutch member being adapted to cooperate with said friction pulley.

6. In starting gear for internal combustion engines in combination, a driven shaft operatively connected with the engine, a driving shaft operatively connected with a source of power, a stationary casing in which said shafts are carried, a planet carrier and planet wheels adapted to rotate on said driving shaft and connected with said driven shaft, a pinion on said driving shaft and an orbit gear, both adapted to mesh with said planet wheels, means for locking said orbit gear against rotation, centrifugal means for releasing said orbit gear, a friction pulley operatively connected with said driving shaft, and a centrifugal clutch member pivoted to said orbit gear, said clutch member being adapted to cooperate with said friction pulley and a spring adapted to act on said clutch member.

7. In starting gear for internal combustion engines in combination, a driven shaft operatively connected with the engine, a driving shaft operatively connected with a source of power, a stationary casing in which said shafts are carried, a planet carrier and planet wheels adapted to rotate on said driving shaft and connected with said driven shaft, a pinion on said driving shaft and an orbit gear, both adapted to mesh with said planet wheels, means for locking said orbit gear against rotation, centrifugal means for releasing said orbit gear, a friction pulley operatively connected with said driving shaft, a pair of substantially semicircular centrifugal clutch members adapted to cooperate with said friction pulley and pivoted to one another and to said orbit gear at one end and resilient means for connecting the free ends of said members.

8. In starting gear for internal combustion engines in combination, a driven shaft operatively connected with the engine, a driving shaft operatively connected with a source of power, a stationary casing in which said shafts are carried, a combined planet carrier and driven shaft adapted to rotate on said driving shaft, a pinion on said driving shaft and an orbit gear, both adapted to mesh with said planet wheels, teeth formed on said casing, a toothed pawl pivoted on said orbit gear and adapted to cooperate with the teeth on said casing, a gear mounted on said orbit gear for free rotation and meshing with the toothed portion of said pawl, a toothed weight pivoted on said orbit gear and adapted to mesh also with the toothed portion of said pawl, a friction pulley operatively connected with said driving shaft, and a centrifugal clutch member pivoted to said orbit gear, said clutch member being adapted to cooperate with said friction pulley.

In testimony whereof I affix my signature.

ARPÁD BÁRÉNYI.